United States Patent [19]

Reh et al.

[11] 4,111,158

[45] Sep. 5, 1978

[54] METHOD OF AND APPARATUS FOR CARRYING OUT AN EXOTHERMIC PROCESS

[75] Inventors: Lothar Reh; Martin Hirsch, both of Frankfurt am Main; Ludolf Plass, Kronberg, all of Germany

[73] Assignee: Metallgesellschaft Aktiengesellschaft, Frankfurt am Main, Germany

[21] Appl. No.: 801,007

[22] Filed: May 26, 1977

[30] Foreign Application Priority Data

May 31, 1976 [DE] Fed. Rep. of Germany ....... 2624302

[51] Int. Cl.² .................... F22B 1/02; F23D 19/00
[52] U.S. Cl. .................... 122/4 D; 110/243; 432/58
[58] Field of Search .............. 122/4 D; 110/8 F, 28 J; 432/58; 34/57 R, 57 A

[56] References Cited

U.S. PATENT DOCUMENTS

| 3,863,577 | 2/1975 | Steever et al. | 432/58 |
| 3,884,193 | 5/1975 | Bryers | 122/4 D |
| 3,932,118 | 1/1976 | Eggers et al. | 432/58 |
| 3,982,884 | 9/1976 | Godel | 432/58 |
| 4,027,602 | 6/1977 | Mott | 110/28 J |

Primary Examiner—Kenneth W. Sprague
Attorney, Agent, or Firm—Karl F. Ross

[57] ABSTRACT

A method of and apparatus for carrying out an exothermic process in which a combustible-containing solid (e.g. coal shale, pyrite or limestone in combination with fuel oil) are burned in a fluidized-bed reactor with primary and secondary streams of oxygen-containing combustion-sustaining gas (in a volume ratio of 1:20 to 2:1) supplied at different levels so that the primary gas acts as the fluidizing gas. The gas velocities and rate of gas feeds are controlled to provide a mean suspension density above the secondary gas inlet of 10 to 40 kg/m³. The major portion of solid feed is introduced into the space below the secondary gas inlet which is maintained substantially free of internal fixtures and the effluent gases are separated from the entrained solids which are recycled to the bed. Solids withdrawn from the bed are cooled in a fluidized-bed cooler and the temperature of the bed is maintained constant by the controlled recirculation of cooled solids thereto from the cooler. The gas heated in the cooler is fed to the bed as the secondary gas.

15 Claims, 3 Drawing Figures

Fig. 2

METHOD OF AND APPARATUS FOR CARRYING OUT AN EXOTHERMIC PROCESS

CROSS-REFERENCE TO RELATED APPLICATION

This application is related to Ser. No. 654 351 filed Feb. 2, 1976, now abandoned, copending and commonly assigned herewith.

FIELD OF THE INVENTION

The present invention relates to a method of and an apparatus for carrying out an exothermic process in which a solid feed contains a combustible (e.g. carbonaceous or sulfurous compounds) and the combustible components of the feed are burned under approximately stoichiometric conditions in a fluidized bed, solids withdrawn from the fluidized bed are recycled into the same, and the heat of combustion is abstracted.

BACKGROUND OF THE INVENTION

Fluidized-bed reactors have been used in exothermic processes, such as the combustion of carbonaceous materials or the roasting of sulfide ores (see British Pat. No. 784 595 and J. R. Grace, *Fluidization and its Application to Coal Treatment and Allied Processes,* AIChE Symposium Series 141, vol. 70, (1974), pages 21 – 26; D. L. Keairns et al., *Design of a Fluidized Bed Combustion Boiler for Industrial Steam Generation,* AIChE Symposium Series 126, vol. 68 (1972), pages 259 – 266; Australian Pat. No. 164 429).

The use of known methods for the combustion of carbonaceous materials involves the disadvantages that the bed must be comparatively low in order to keep the pressure drop within reasonable limits, that the presence of cooling surfaces (internal fixtures) in the lower part of the reactor space disturbs the transverse mixing of the solids in the fluidized bed so that inhomogeneities of temperature (overheating, crusts) occur, and that the operation of the reactor cannot be perfectly adapted to the output actually required, which often fluctuates. This adaptation can be accomplished virtually only by a decrease of temperature, although such decrease involves less satisfactory combustion and fluidization conditions, or by a shutdown of individual reactor units.

Equipment is known in which the temperature in the fluidized bed can be increased or decreased in that solids withdrawn from the fluidized bed are heated or cooled in a second fluidized bed and are then recycled to the first fluidized bed through suitable lock chambers and overflow means (U.S. Pat. No. 3 921 590).

For instance, a combustion process can be carried out in the first fluidized bed and fluidized solids can be fed from the first fluidized bed to the second to be cooled therein and subsequently are recycled to the first bed. The use of such apparatus involves the disadvantage that the pressure drop in the fluidized bed used for the combustion process is high owing to the condition of this bed. For this reason, the fluidizing gases must be compressed to a high pressure with a high expenditure of energy.

In addition the fluidizing gases used to cool the solids withdrawn from the fluidized bed do not contribute to the economy of the process but only increase the rate at which exhaust gases are produced in the combustion process.

In the roasting sulfide ores in a fluidized bed in accordance with Australian Pat. No. 164 429, inhomogeneities of temperature will inevitably be caused by the spontaneous combustion of the sulfur in the presence of the total quantity of oxygen which is required. This results in calcines which have undesired metallurgical properties.

OBJECTS OF THE INVENTION

It is an object of the present invention to provide a method which avoids the above-mentioned disadvantages and others recognized to exist in prior art processes, and which can readily be adapted to the required output without an increased capital, energy and process expenditure.

It is another object of the invention to provide a method of reacting a combustible-containing solid which, while retaining advantages of a fluidized-bed process, is more economical, efficient and versatile than earlier systems.

Still another object of the invention is to provide an improved method of and apparatus for carrying out an exothermic process.

A further object is to provide a method of operating a combustion plant with high energy economy and greater control of the output of the plant without having to reduce efficiency and shut down units.

SUMMARY OF THE INVENTION

We have found, surprisingly, that these objects can be attained by a combination of steps all of which have been found to be critical, and the associated apparatus elements, namely:

(a) carrying out the combustion with oxygen-containing combustion-sustaining gases fed in two partial streams on different levels, at least one of said partial streams being fed as secondary gas on one level or on a plurality of superimposed levels above that at which the primary gas is admitted to the fluidized-bed reactor;

(b) maintaining the volume ratio of fluidizing gas to secondary gas in the critical range from 1:20 to 2:1;

(c) establishing the gas velocity and the ratio of the fluidizing gas rate to the secondary gas rate so that a fluidized-bed condition is created which includes a mean density of the suspension of 10 to 40 kg/m$^3$ above the secondary gas inlet;

(d) charging a major portion of the feed into a space in the reactor which is below the secondary gas inlet and virtually free of internal fixtures;

(e) withdrawing solids from the circulation system consisting of the fluidized-bed reactor, solids/gas separator, and recycling conduit;

(f) cooling the withdrawn solids, preferably with generation of steam, by direct and indirect heat exchange in a fluidized-bed cooler;

(g) recycling at least part of the cooled solids to the fluidized-bed reactor to maintain a predetermined but adjustable constant temperature therein; and (h) feeding the hot fluidizing gas from the fluidized-bed cooler as secondary gas to the fluidized-bed reactor.

Whereas in an orthodox fluidized bed, a dense phase is separated by a sudden change in density from the overlying gas space, the fluidized bed used in accordance with the invention exhibits states of distribution which are not defined by a distinct boundary layer. There is no sudden change in density between a dense phase and an overlying gas space, and the solids concentration in the reactor decreases continuously from bottom to top, i.e. the fluidized bed is an expanded fluidized bed.

When Froude's number and Archimedes' number are used to define the operating conditions, the following ranges can be determined:

$$0.1 \leq \frac{3}{4} \times \frac{u^2}{g \times d_k} \times \frac{\rho_g}{\rho_k - \rho_g} \leq 10$$

and $$0.01 \leq Ar \leq 100$$

$$Ar = \frac{d_k^3 \times g(\rho_k - \rho_g)}{\rho_g \times \nu^2}$$

wherein:
 $u$ = relative gas velocity in m/sec.
 $Ar$ = Archimedes' number
 $\rho_g$ = density of gas in kg/m$^3$
 $\rho_k$ = density of solid particle in kg/m$^3$
 $d_k$ = diameter of spherical particles in m
 $\nu$ = kinematic viscosity in m$^2$/sec.
 $g$ = constant of gravitation in m/sec.$^2$ The process according to the invention is distinguished in that the combustion process can be carried out at high throughput rates and at a highly constant temperature. This is of considerable importance in the combustion of carbonaceous materials in view of the formation of nitrogen oxides (NO$_x$) and also of the behavior of the ash, e.g., the leachability and the hydraulic behavior of the ash produced by the combustion of oil shale, and in the metallurgical properties of the products of roasting processes.

A constant temperature can be maintained solely by the controlled recycling of the cooled solids, i.e. without a need for a change of the operating conditions in the fluidized-bed reactor, e.g., without a change of the density of the suspension and a change of other variables. The recycling rate must be selected in dependence upon the combustion rate and the selected combustion temperature.

The process according to the invention permits an adjustment of the combustion temperature from very low temperatures, which are only slightly above the ignition limit, to very high temperatures, which are close to an upper limit defined by the softening of the combustion residue or of any inert fluidized solids if inert bed material is used. In practice, the combustion temperature lies in a range from about 450° C to 1200° C.

A special advantage afforded by the invention resides in that a highly constant temperature and a combustion under approximately stoichiometric conditions usually involving high combustion temperatures are enabled even at relatively low combustion temperatures, which are desirable for various reasons.

Because the heat generated by the combustion of the combustible component is mainly abstracted (recovered) in the fluidized-bed cooler, which succeeds the fluidized-bed reactor in the solids flow path, a heat transfer to cooling registers contained in the fluidized-bed reactor is of minor significance. Such heat transfer would require a high density of the suspension. For this reason the method affords the additional advantage that a low density of the suspension is permissible in the fluidized-bed reactor above the secondary gas inlet so that the total pressure drop in the fluidized-bed reactor is comparatively small.

Heat is recovered in the fluidized-bed cooler under conditions which result in an extremely high coefficient of heat transfer, e.g. in the range from 400 to 500 Watts/m$^2$ · ° C. This is due to the fact that the fluidized-bed cooler can be operated under conditions which are optimum for the cooling of solids and particularly involve a high density of the suspension.

The method according to the invention is free from detrimental influences which are due to afterburning, overheating, corrosion, etc., which would otherwise have to be taken into account if the cooling were effected in the combustion reactor, as is customary.

Certainly, the operation of the fluidized-bed cooler with a high density of the suspension, resulting in a high pressure drop, requires a high pressure of the fluidized gases. But since the ratio of the rates at which the fluidizing gases are fed to the fluidized-bed reactor and the fluidized-bed cooler, respectively, are advantageously in the range from about 4:1 to 1:1, preferably to 2.5:1, the rate at which gas under a high pressure is required is only a relatively small part, about 30%, on an average, of the total rate, and may be even less than 30% if the fluidized-bed reactor is fed with secondary gas that is not supplied by the fluidized-bed cooler. About 70% or correspondingly more of the oxygen-containing gases required for the combustion can be fed at a much lower pressure than is otherwise usual to the fluidized-bed reactor, which operates with a low pressure drop.

Any desired coolant can be used in the fluidized-bed cooler. Heat transfer liquids may be used for this purpose. Water is preferably used as a coolant so that the cooling results in a generation of steam.

To control the combustion temperature in the fluidized-bed reactor, at least part of the cooled solids are recycled from the fluidized-bed cooler. For example, the required part of cooled solids may be directly fed to the fluidized-bed reactor as an essential feature of maintaining the temperature therein constant.

The exhaust gas from the fluidized-bed reactor can be cooled in a waste-heat boiler in known manner. It is particularly desirable to cool the exhaust gas by feeding cooled solids into the same, e.g. into a pneumatic conveyor line or a suspension-type heat exchanger stage. The solids are subsequently separated from the exhaust gas and may then be recycled to the fluidized-bed cooler so that heat which might otherwise be lost with the exhaust gas is also finally transferred to the fluidized-bed cooler.

In a particularly preferred embodiment of the method according to the invention, one partial stream of cooled solids is directly fed to the fluidized-bed reactor and another partial stream of cooled solids is used to cool the exhaust gases and subsequently fed to the fluidized-bed reactor. Solids at the combustion temperature are fed from the fluidized-bed reactor to the fluidized-bed cooler.

The combustion is effected in two stages because the oxygen-containing gas required for the combustion of the combustible constituents of the fed material is fed in two partial streams on different levels. This results in a progressive weak combustion, which involves no local overheating so that the formation of encrustations and of nitrogen oxides in amounts above 100 ppm. is avoided. Hence the gases can be directly released into the atmosphere without treatment to reduce the $NO_x$ content.

Because the lower part of the reactor space, disposed below the secondary gas inlet, is substantially free of internal fixtures, the feed which has entered the reactor is effectively distributed instantaneously. The rapid mixing with the hot bed solids ensures also a good ignition. Short reaction times are possible because the feed is fine-grained, having a mean particle diameter of, e.g. 30 to 250 μm, and for this reason has a large surface area.

The fluidized-bed reactor used for combustion can be rectangular (e.g. square) or circular in cross-section. The lower portion of the fluidized-bed reactor can be tapered. This is particularly desirable where the reactor is large in cross-section and where an inert fluidizing gas is employed.

The gas velocities in the fluidized-bed reactor above the secondary gas inlet are usually above 5 m/sec. and may be as high as 15 m/sec. if the operation is at atmospheric pressure.

The ratio of the diameter to the height of the fluidized-bed reactor should be selected so that gas residence times of 0.5 to 8.0 seconds, preferably 1 to 4 seconds, are obtained.

The fluidizing gas can consist virtually of any desired gas which will not adversely affect the properties of the exhaust gas. Suitable fluidizing gases include inert gases, such as recycled flue gas (exhaust gas), nitrogen, and water vapor. To intensify the combustion process it is desirable to feed a partial stream of the oxygen-containing gases required in the fluidized-bed reactor as fluidizing gas to said reactor.

It is apparent that the method can be carried out in either of two modes:

1. An inert fluidizing gas is used. In this case the oxygen-containing combustion gas must be fed as secondary gas on at least two superimposed levels.

2. Oxygen-containing fluidized gas is used. In this case, secondary gas may be fed on a single level although the secondary gas may be fed on a plurality of levels in this mode also.

A plurality of inlets for the secondary gas are desirably provided on each level at which secondary gas is fed.

According to a further preferred feature of the method according to the invention, the secondary gas is fed on a level which is spaced above the fluidizing gas inlet by a distance of up to 30% of the total height of the space of the fluidized-bed reactor and at least by a distance of 1 m. If the secondary gas is fed on a plurality of levels, the above feature will be applicable to the level of the uppermost secondary gas inlet. The feeding at this level will provide a sufficiently large space for the first combustion stage so that the reaction between the combustible components and the oxygen-containing gas, which may be fed as fluidizing gas or as secondary gas on a lower level, and the combustible component is almost completed in said stage, and a sufficiently large final combustion zone can be provided in the upper portion of the reactor space above the secondary gas inlet.

The wall of the fluidized-bed reactor is suitably provided with cooling surfaces (preferably above the secondary gas inlet). Cooling surfaces may also be provided in the free space of the reactor (above the secondary inlet) but are of minor significance and may be omitted in certain cases, e.g. where fuels are employed which have low calorific values. Any cooling surfaces which are provided should consist of tube walls, which are subjected to a once-through coding and in which the tubes are spaced apart by clearances of at least 150 mm, preferably 250 – 500 mm. To minimize erosion, the axes of the tubes should be parallel to the direction of flow of the gas-solids suspension.

It will be particularly desirable to cool the solids discharged from the fluidized-bed reactor in a counterflow to the coolant in a fluidized-bed cooler comprising a plurality of cooling chambers, which are traversed in succession and in which interconnected cooling registers are immersed. In this case, the heat of combustion can be transferred to a coolant flowing at a comparatively low rate and superheated steam can be produced, which can be economically utilized.

When carbonaceous materials are burned, it can be desirable to minimize the sulfur content of the exhaust gas. This can be accomplished in that the combustion process is carried out in the presence of fine-grained desulfurizing agents, such as lime, dolomite, and the like. The desulfurizing agents should have approximately the same particle size as the carbonaceous solids and may simply be fed together with such solids. If the exhaust gas is cooled with cooled solids, the desulfurizing agent may be fed together with such cooled solids. The constant temperature which is ensured by the method according to the invention is beneficial also for the desulfurization because the desulfurizing agent preserves its activity and its ability to combine with sulfur. This advantage is supplemented by the small particle size of the desulfuring agent because the ratio of surface area to volume is particularly favorable for the sulfur-combining rate, which depends mainly on the diffusion velocity.

The output of a reactor having given dimensions can be increased in that, in accordance with a further preferred feature of the invention, the combustion process is not carried out with ordinary air but with air which has been enriched with oxygen and/or is under superatmospheric pressure, preferably up to 20 $kg/cm^2$ above atmospheric pressure.

The feed is supplied to the fluidized-bed reactor in a conventional manner, suitably through one or more lances or tuyeres and may be blown in pneumatically. The effective transverse mixing permits the use of feeding lances or tuyeres in a relatively small number and even a single lance may be sufficient if the fluidized-bed reactor is relatively small.

The process according to the invention is particularly suitable for the combustion of carbonaceous materials, i.e. of all kinds of coal, coal washery refuse, retort residues, oil shale, fuel oil, and mixtures thereof. If fuel oil is used as carbonaceous material, an auxiliary bed is required, which may consist, e.g. of fine-grained sand, lime, dolomite, or other mineral solids. Additional fields of application include the roasting of various sulfide ores or ore concentrates.

If the feed contains substantial proportions of residues, the surplus quantity is removed behind the fluidized-bed cooler through lock chambers from the system which includes the fluidized-bed reactor and the fluidized-bed cooler.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
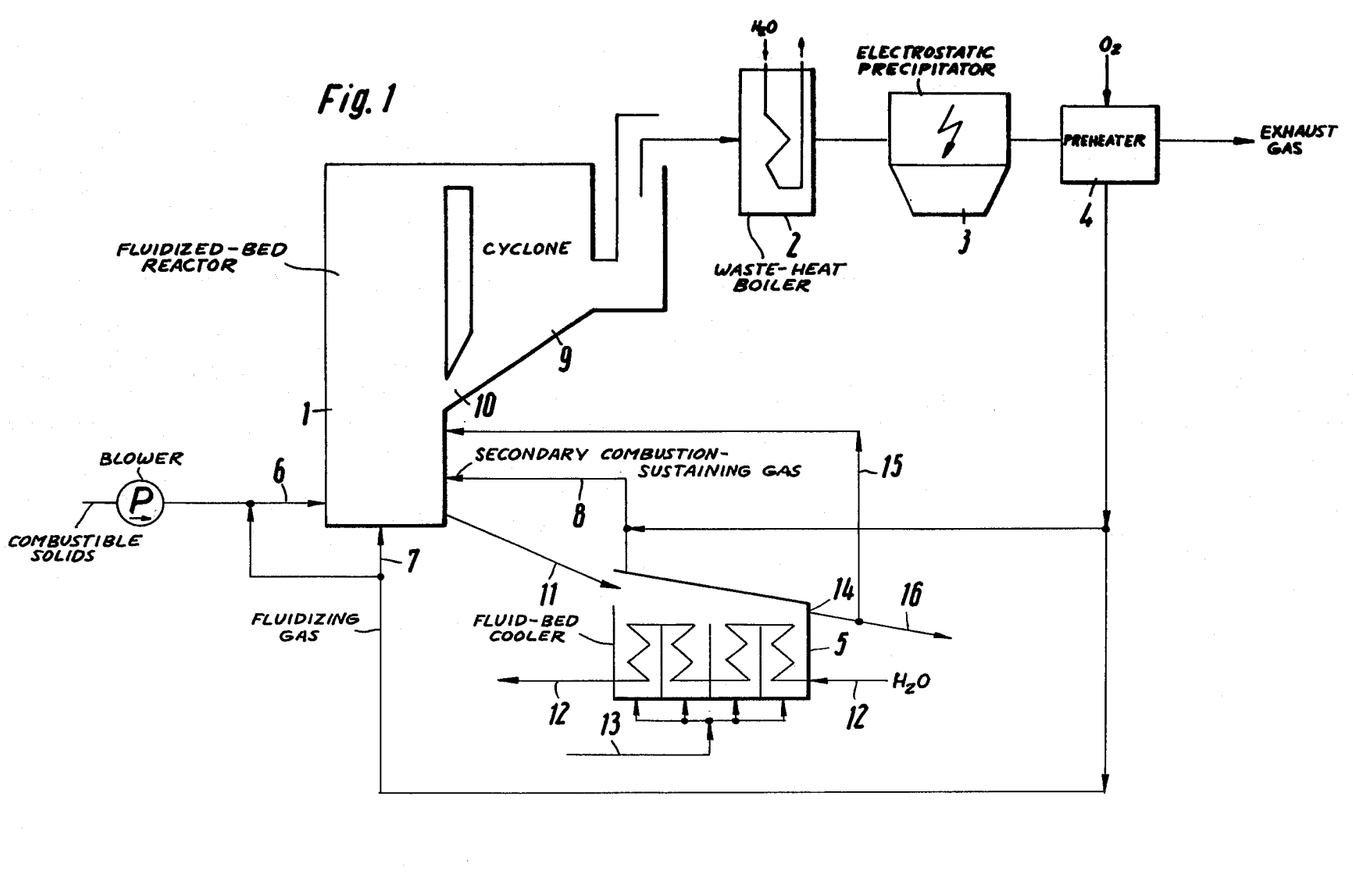
FIG. 1 is a flow diagram illustrating the method and apparatus in which cooled solids are recycled only to the fluidized-bed reactor.

FIG. 1 shows a fluidized-bed reactor 1, a waste-heat boiler 2, which follows the reactor 1 in the exhaust gas flow path (i.e. is downstream thereof), an electrostatic precipitator 3, a preheater 4 for oxygen-containing gas and a fluidized-bed cooler 5 having four cooling chambers.

Solids which contain combustible components are pneumatically fed through a lance or tuyere 6 to the fluidized-bed reactor 1. To produce and maintain a fluidized-bed condition in the fluidized-bed reactor 1, the same is fed with fluidizing gas through conduit 7 and with a secondary gas through conduit 8. Under the resulting condition of fluidization, the combustible components of the feed are burned in two stages.

A major portion of the unburned solids are entrained by the gases out of the fluidized-bed reactor 1 and are separated from the gas in a cyclone separator 9. The exhaust gas is then fed to the waste-heat boiler 2 and is cooled therein to a temperature which is suitable for the subsequent collection of dust, and then flows through the electrostatic precipitator 3 and a preheater 4 for oxygen-containing gas to the chimney (not shown).

The preheated gas is fed to the fluidized-bed reactor in part as secondary gas through conduit 8, in part as fluidizing gas through conduit 7, and in part as conveying gas for pneumatically feeding the solids to be fed through conduit 6.

The solids collected in the cyclone separator 9 are recycled through conduit 10 to the fluidized-bed reactor 1 to maintain the fluidized-bed condition therein. Solids are withdrawn from the fluidized-bed reactor 1 through conduit 11 and are fed to the fluidized-bed cooler 5, in which the solids flow in succession through four chambers, which are provided with continuous cooling registers 12 immersed in respective chambers. As the solids flow through the fluidized-bed cooler, the sensible heat of the solids is transferred in part to the feed water fed to the cooling registers 12, in which steam is produced, and in part to the fluidizing gases fed through conduit 13. The produced steam is used for any desired purpose.

Cooled solids are withdrawn from the fluidized-bed cooler 5 through discharge means 14 (e.g. an overflow). Parts of said cooled solids are recycled through conduit 15 to the fluidized-bed reactor 1. Any surplus solids produced are withdrawn through conduit 16. Under constant conditions of operation (i.e. the steady state of the invention), the rate of said surplus solids corresponds to the feed rate of incombustible residue of the feed.

The heated gas which leaves the four chambers of the fluidized-bed cooler 5 is collected under the hood of said cooler and together with the partial gas stream from the preheater 4 is fed as secondary gas through conduit 8 to the fluidized-bed reactor 1.

Figure 2:
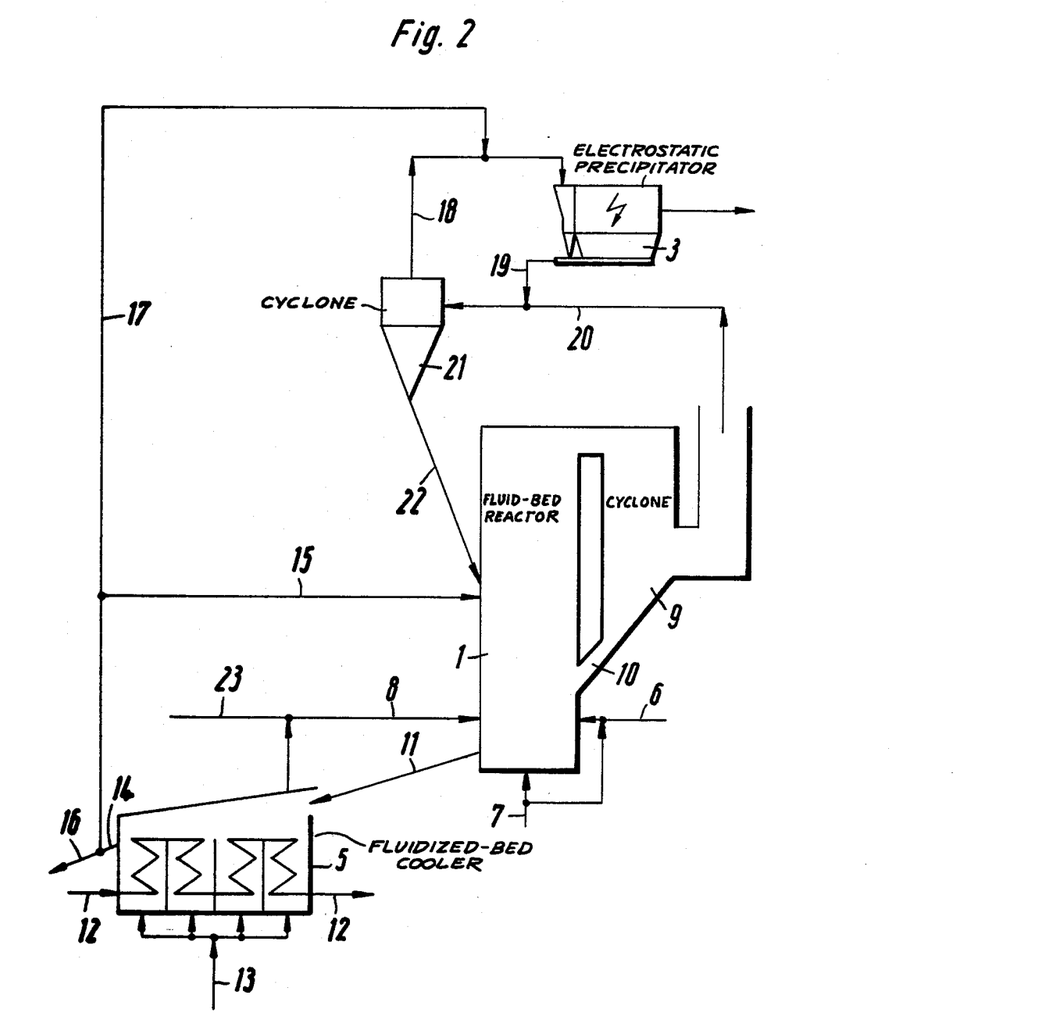
FIGS. 2 and 3 are two flow diagrams illustrating the method and apparatus in which part of the cooled solids are directly recycled to the fluidized-bed reactor and part of the cooled solids are used to cool the exhaust gases and subsequently recycled to the fluidized-bed reactor.

Just as FIG. 1, FIG. 2 shows a fluidized-bed reactor 1, and electrostatic precipitator 3, and a fluidized-bed cooler 5 having four cooling chambers.

The feeding of solids, fluidizing gas and secondary gas through lances 6 and conduits 7 and 8 as well as the combustion and discharge and collection of burned solids are accomplished as illustrated in the flow scheme of FIG. 1. The solids withdrawn through conduit 11 are also cooled with production of steam and heated secondary gas and are subsequently withdrawn from the fluidized-bed cooler 5 through the discharge means 14 and partly discarded through conduit 16.

The partial stream of solids intended to be returned to the fluidized-bed reactor 1, however, is divided into two partial streams, one of which is directly supplied through conduit 15 to the fluidized-bed reactor 1. The second partial stream flows through conduit 17 and an exhaust gas conduit 18 leading to the electrostatic precipitator 3 and becomes suspended in the exhaust gas to cool the same and is subsequently collected in the electrostatic precipitator 3. The collected solids flow through conduit 19 to the pipe 20 for conducting exhaust gas from the cyclone separator 9. In the pipe 20, the solids take up additional heat to effect a preliminary cooling of the exhaust gas. The solids are then collected in an additional cyclone separator 21 and are fed through a gravity pipe 22 to the fluidized-bed reactor 1.

In the mode represented in FIG. 2, the fluidizing gas for the fluidized-bed reactor 1 is not preheated. Besides, the rate of secondary gas flowing from the fluidized-bed cooler 5 through conduit 8 to the fluidized-bed reactor 1 is increased by additional oxygen-containing gas, which has not been preheated and is supplied through conduit 23.

Figure 3:
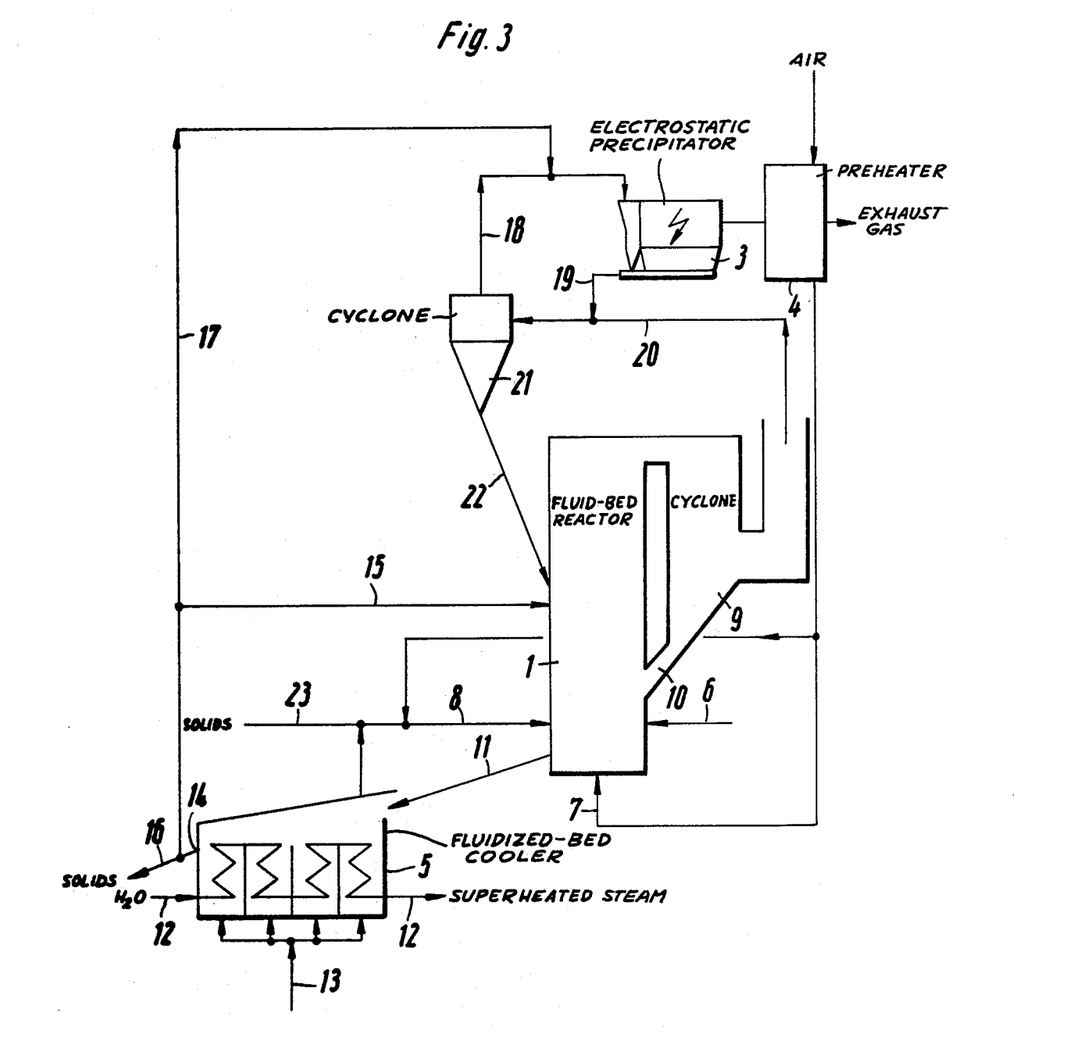

FIG. 3 differs from FIG. 2 only in that the electrostatic precipitator 3 is succeeded by a preheater 4 for oxygen-containing gas.

EXAMPLE 1 (WITH REFERENCE TO FIG. 1)

Coal shale was burned with air in a fluidized-bed reactor, which had a bottom area of 1 × 1 $m$ and a height of 12 $m$. The reactor had no cooling surface. 7 metric tons/hour of coal shale having a lower heating value $H_u = 760$ kcal/kg ($= 3.2$ MJ/kg) and a mean particle diameter of 0.2 mm were pneumatically fed through conduit 6 by means of 700 standard m$^3$/h air at 250° C. The fluidized gas consisted of air, which was fed at 250° C through conduit 7 at a rate of 4000 standard m$^3$/h to the fluidized-bed reactor 1. The secondary gas consisted of air, which had been heated to 268° C and was fed to the fluidized-bed reactor 1 through conduit 8 at a rate of 4200 standard m$^3$/h. The mean density of the suspension in the fluidized-bed reactor 1 amounted to 200 kg/m$^3$ below the secondary gas inlet 8 and to 15 kg/m$^3$ above said inlet. The temperature in the entire circulation system consisting of the fluidized-bed reactor 1, the cyclone separator 9, and the conduit 10 amounted to 800° C.

17.6 metric tons/hour of incombustible solids were fed through conduit 11 to the fluidized-bed cooler 5, which comprised four chambers and interconnected cooling registers 12, which were immersed in respective chambers and had a cooling surface of 82 m$^2$. The fluidizing gas consisted of 2500 standard m$^3$/h of air, which was heated to 280° C and subsequently fed as secondary gas to the fluidized-bed reactor 1. The cooled solids were discharged at 100° C from the fluidized-bed cooler 5.

A partial stream of solids at a rate of 11.6 metric tons/hour was recycled through conduit 15 to the fluidized-bed reactor 1 to maintain a temperature of 800° C in the circulation system.

The fluidized-bed cooler 5 was operated with a mean solids concentration of 500 kg/m³ and a coefficient of heat transfer of 400 W/m²·° C. Heat at a rate of $3.5 \times 10^6$ W was dissipated through the cooling surfaces 12 to produce saturated steam at 60 bars.

A waste-heat boiler 2 was used to cool the exhaust gas leaving the cyclone separator 9 to 300° C. At this temperature, the exhaust gas entered the electrostatic precipitator 3 and the preheater 4, in which 6400 standard m³/h of air were heated from 50° C to 250° C and the exhaust gas was cooled to 155° C. The heated air was used at a rate of 1700 standard m³/h as additional secondary gas, at a rate of 4000 standard m³/h as fluidizing gas and at a rate of 700 standard m³/h as conveying gas.

EXAMPLE 2 (WITH REFERENCE TO FIG. 2)

Pyrite was burnt with air in the fluidized-bed reactor which was like that used in Example 1 but provided with a cooling surface of 20 m² on its wall above the secondary gas inlet.

3.1 metric tons/hour of pyrite which had a lower heating value $H_u = 1530$ kcal/kg (=6.4 MJ/kg), a sulfur content of 47% by weight, and a mean particle diameter of 0.08 mm, were pneumatically fed 0.2 m above the grate through conduit 6 by means of 300 standard-m³/h of air. The fluidizing gas for the fluidized-bed reactor 1 consisted of 2500 standard m³/h of air, which were fed through conduit 7. 4400 standard m³/h of air were fed as secondary gas through conduit 8. The mean density of the suspension amounted to 150 kg/m³ below the secondary gas inlet and to 20 kg/m³ above the same.

17.2 metric tons/hour of calcine consisting mainly of $Fe_2O_3$ were discharged through conduit 11 and were cooled in the fluidized-bed cooler 5, which comprised four chambers and continuous cooling registers 12, which had a cooling surface of 68 m² and were immersed in respective chambers. 1700 standard m³/h of air were used to fluidize the solids. This air was heated to 300° C and was subsequently fed through conduit 8 as secondary gas to the fluidized-bed reactor 1. The calcine was discharged from the discharge means 14 at a temperature of 100° C.

2.5 metric tons/hour of the discharged calcine were directly fed through conduit 15 to the fluidized-bed reactor 1. Another partial stream of 12.5 metric tons/hour was fed through conduit 17 to the gas conduit 18, in which the exhaust gas was thus cooled to a temperature of 350° C, which was permissible with a view to the acid dew point. The solids collected in the electrostatic precipitator 3 were fed through conduit 19 to the gas conduit 20 and were collected in the cyclone separator 21 and fed through the gravity pipe 22 into the fluidized-bed reactor 1. Owing to the recycling of solids, a temperature of 900° C was maintained in the circulation system consisting of the fluidized-bed reactor 1, the cyclone separator 9, and the recycle conduit 10.

2.2 metric tons/hour of surplus calcine having a residual sulfur content of 0.5% by weight were discharged through conduit 16.

The suspension in the fluidized-bed cooler 5 had a density of 500 kg/m³. The coefficient of heat transfer amounted to 400 W/m²·° C. Energy at a rate of $3.4 \times 10^6$ watts was dissipated with production of saturated steam.

The cooling surface of the fluidized-bed reactor 1 operated at a coefficient of heat transfer of 90 W/m²·° C. Corresponding to a heating at a rate of $1.2 \times 10^6$ watts, saturated steam at 60 bars was produced. It is apparent that heat at a rate of $5.6 \times 10^6$ watts was produced by the roasting of the pyrites and that $4.6 \times 10^6$ watts of said heat were used to produce saturated steam.

EXAMPLE 3 (WITH REFERENCE TO FIG. 3)

Oil and air were burned in a fluidized-bed reactor of the dimensions used in Example 1. The fluidized solids consisted of limestone having a mean particle diameter of 0.1 - 0.2 mm.

0.73 metric ton/hour of fuel oil having a heating value of 9800 kcal/kg (= 41 MJ/kg) and a sulfur content of 3.4% by weight were fed through lance 6. The fluidizing gas consisted of 3700 standard m³/h of air at 165° C and the secondary gas of 4800 standard m³/h of air at 220° C. The suspension in the fluidized-bed reactor 1 had a mean density of 150 kg/m³ in the reactor space below the secondary gas inlet 8 and of 15 kg/m³ above said inlet. The temperature in the entire circulation system consisting of the fluidized-bed reactor 1, the cyclone separator 9 and the conduit 10 was about 850° C.

37.9 metric tons/hour of solids were withdrawn through conduit 11 and fed to the fluidized-bed cooler 5, which comprised four chambers and continuous cooling registers 12, which had a cooling surface of 159 m² and were immersed in the cooling chambers. Heat at a rate of $8 \times 10^6$ was dissipated to produce saturated steam at 60 bars and to cool the solids to 100° C. 2300 standard m³/h of fluidizing gas were fed to the fluidized-bed cooler 5, which was operated with a density of suspension of 500 kg/m³ and a coefficient of heat transfer of 400 W/m²·° C.

To control the temperature in the circulating system, 11.9 metric tons/hour of solids discharged from the fluidized-bed cooler were fed through conduit 15 to the fluidized-bed reactor 1. 26 metric tons/hour of cooled solids were used to cool the exhaust gas and together with 68 kg/h burned lime were fed through conduit 17 to the gas conduit 18. The exhaust gases were thus cooled to 200° C and the solids were correspondingly heated. The solids and exhaust gas were separated in an electrostatic precipitator 3, which was preceded by a preliminary separator. The collected solids were fed through conduit 19 to the gas conduit 20 and were heated therein to 410° C by the exhaust gases from the reactor. When solids and gas have been separated in a cyclone separator 21, the solids were fed through a conduit 22 to the fluidized-bed reactor 1.

The exhaust gas at 200° C leaving the electrostatic precipitator 3 was cooled in a succeeding preheater 4 to 120° C by means of air, which was thus heated to 165° C. The sulfur content of the exhaust gas corresponded to a desulfurization of 90%.

We claim:

1. A method of carrying out an exothermic process in which a combustible substance is burned in a bed of fluidized solids in a fluidized-bed reactor, solids entrained with gas from the bed are separated from the gas in a solid/gas separator, and separated solids are returned to the fluidized-bed reactor through a recycling conduit, the reactor, separator and recycling conduit forming a circulating system for the solids, said method comprising the steps of:

(a) feeding an oxygen-containing gas into said reactor on different levels in two partial streams whereby at least one of said streams is constituted as secondary gas and is introduced at least at one location above the level of introduction of fluidizing gas into the reactor;

(b) maintaining the volume ratio of fluidizing gas fed to said reactor and secondary gas between 1:20 and 2:1;

(c) introducing said gases into said fluidized-bed reactor so that said fluidized bed has a continuous solids density gradient from the bottom of the fluidized bed to the top of said fluidized-bed reactor and said bed has a mean density of the suspension above the secondary gas inlet of 10 to 40 kg/m$^3$ (d) feeding solids and a combustible component into a space in said fluidized-bed reactor below said secondary gas inlet and substantially free from internal fixtures;

(e) withdrawing hot solids from said circulating system;

(f) cooling the solids withdrawn in step (e) by direct and indirect heat exchange in a fluidized-bed cooler;

(g) recycling at least part of the cooled solids from step (f) to said reactor to maintain a predetermined constant reaction temperature therein; and (h) feeding hot gas from said fluidized-bed cooler as said secondary gas to the fluidized-bed reactor.

2. The method defined in claim 1 wherein water is converted to superheated steam by indirect heat exchange with said solids in said fluidized-bed cooler.

3. The method defined in claim 1 wherein said secondary gas is introduced into said reactor at a plurality of levels above the level of introduction of said fluidizing gas.

4. The method defined in claim 1, further comprising the step of cooling exhaust gas withdrawn from said fluidized-bed reactor by introducing cooled solids from said fluidized-bed cooler into the withdrawn exhaust gas.

5. The method defined in claim 1 wherein a first partial stream of cooled solids is fed from said fluidized-bed cooler directly to said reactor while another partial stream of cooled solids is used to cool exhaust gas withdrawn from said reactor, the solids thus used to cool said exhaust gas being thereafter introduced into said reactor.

6. The method defined in claim 1 wherein said fluidizing gas is one of said two partial streams of oxygen-containing gas.

7. The method defined in claim 1 wherein said secondary gas inlet is spaced above the fluidizing gas inlet by a distance of up to 30% of the total height of the fluidized bed in said reactor and by at least one meter.

8. The method defined in claim 1 wherein said solids are cooled in said fluidized-bed cooler by passing them in succession through a plurality of cooling chambers and by passing a coolant through interconnected cooling registers immersing in said chamber in counterflow to the solids.

9. The method defined in claim 1 wherein the combustible component burned in said reactor is a carbonaceous material, further comprising the step of introducing a fine-grain desulfurizing agent into said reactor.

10. The method defined in claim 1 wherein said oxygen-containing gas is oxygen-enriched air.

11. The method defined in claim 1, further comprising the step of operating said reactor under a superatmospheric pressure of up to 20 kg/cm$^2$.

12. A method of operating a plant for the combustion of a carbonaceous or sulfur-containing material, said plant comprising an upright fluidized-bed reactor, a fluidizing gas inlet at the bottom of said reactor, a secondary gas inlet opening into said reactor above the bottom thereof, an outlet at the top of said reactor for withdrawing exhaust gas and entrain solids therefrom, a gas-solids separator connected to said outlet for separating said exhaust gas from the solids entrained therewith, a recycling conduit connecting said separator with the interior of said reactor for recirculating separated solids thereto, and a fluidized-bed cooler, said method comprising the steps of:

(a) feeding an oxygen-containing gas into said reactor on different levels in two partial streams whereby at least one of said streams is constituted as secondary gas and is introduced at least at one location above the level of introduction of fluidizing gas into the reactor;

(b) maintaining the volume ratio of fluidizing the gas to secondary gas between 1:20 and 2:1;

(c) adjusting the gas velocity and ratio of the fluidizing gas rate to the secondary gas rate to provide a continuous expanded-bed density gradient of the solids in the reactor from the bottom thereof to said outlet, the density above the secondary gas inlet being 10 to 40 kg/m$^3$;

(d) introducing combustibles into said reactor below said secondary gas inlet and into a space in said reactor substantially free from internal fixtures;

(e) withdrawing solids from the circulating system consisting of said reactor, said separator and said conduit and cooling the withdrawn solids in said fluidized-bed cooler by direct and indirect heat exchange;

(f) maintaining the temperature within said reactor substantially constant by feeding a controlled portion of the cooled solids from said fluidized-bed cooler thereto; and (g) heating at least a portion of said secondary gas by using said portion of said secondary gas as the fluidizing gas in said cooler and thereafter introducing the fluidizing gas from said cooler into said reactor through said secondary gas inlet.

13. The method defined in claim 12, further comprising the steps of:

heating water to produce superheated steam by indirect heat exchange with said solids in said fluidized-bed cooler;

cooling exhaust gas withdrawn from said reactor at said outlet by introducing cooled solids from said cooler thereto; and collecting the solids introduced into said exhaust gas with an electrostatic precipitator.

14. A plant for the combustion of a combustible material which comprises:

(a) an upright fluidized-bed reactor comprising:
a fluidizing gas inlet at the bottom of said reactor, a secondary gas inlet opening into said reactor at a distance of at least one meter above said bottom of said reactor, the space within said reactor between said bottom and said secondary gas inlet being free from internal fixtures, and an outlet at the top of said reactor for exhaust gas entraining solids therewith;

(b) a cyclone connected to said outlet for separating solids from said exhaust gas;

(c) a recycling conduit connecting said cyclone with the interior of said reactor for returning said solids to said reactor;

(d) means for withdrawing hot solids from the circulating system consisting of said reactor, said separator and said recycling conduit;

(e) a fluidized-bed cooler receiving withdrawn solids from the last-mentioned means, said fluidized-bed cooler comprising:

a plurality of compartments traversed by the solids to be cooled in succession, means for fluidizing the solids in each of said compartments, respective cooling registers in contact with the solids in each of said compartments, means for passing a coolant through said registers in succession and in a direction opposing the direction of movement of solids from compartment to compartment in said fluidized-bed cooler, and means for feeding fluidizing gas, heated in said cooler, to said secondary gas inlet; and (f) control means for feeding a proportion of cooled solids from said cooler to said reactor to maintain the temperature therein substantially constant.

15. The plant defined in claim 14, further comprising:

means for feeding another portion of cooled solids from said cooler to the exhaust gas separated from the solids entrained, thereby cooling the exhaust gas; and an electrostatic precipitator for separating the cooling solids from the cooled exhaust gas.

* * * * *